United States Patent [19]

Jalfon et al.

[11] Patent Number: 5,909,702

[45] Date of Patent: Jun. 1, 1999

[54] MEMORY ADDRESS TRANSLATIONS FOR PROGRAMS CODE EXECUTION/RELOCATION

[75] Inventors: Marc Jalfon, Haifa, Israel; David Regenold, Mesa; Franco Ricci, Chandler, both of Ariz.; Ramprasad Satagopan, Sunnyvale, Calif.

[73] Assignee: Intel Corporation, Santa Clara, Calif.

[21] Appl. No.: 08/724,610

[22] Filed: Sep. 30, 1996

Related U.S. Application Data

[60] Provisional application No. 60/004,638, Sep. 29, 1995.

[51] Int. Cl.$^6$ .................................................... G06F 13/00
[52] U.S. Cl. ........................... 711/203; 711/202; 711/170; 711/6; 711/171
[58] Field of Search .................................... 711/147, 165, 711/170, 6, 202, 203, 5, 171

[56] References Cited

U.S. PATENT DOCUMENTS

| | | | |
|---|---|---|---|
| 4,487,873 | 12/1984 | Price et al. ............................. | 395/873 |
| 4,616,310 | 10/1986 | Dill et al. ............................... | 364/200 |
| 4,814,970 | 3/1989 | Barbagelata et al. .................. | 364/200 |
| 4,860,252 | 8/1989 | Sykora .................................... | 364/900 |
| 5,010,476 | 4/1991 | Davis ...................................... | 711/147 |
| 5,333,269 | 7/1994 | Calvignac et al. ..................... | 395/200 |
| 5,379,388 | 1/1995 | Asghar .................................... | 395/375 |
| 5,423,008 | 6/1995 | Young et al. ........................... | 395/325 |
| 5,521,880 | 5/1996 | McClure ................................. | 365/233.5 |
| 5,539,896 | 7/1996 | Lisle ........................................ | 711/150 |
| 5,572,695 | 11/1996 | Andrews et al. ....................... | 711/202 |
| 5,611,075 | 3/1997 | Garde ...................................... | 711/153 |
| 5,630,153 | 5/1997 | Intrater et al. ......................... | 395/800.35 |
| 5,685,005 | 11/1997 | Garde et al. ............................ | 711/153 |
| 5,696,913 | 12/1997 | Grove et al. ............................ | 395/311 |
| 5,737,760 | 4/1998 | Grimmer, Jr et al. .................. | 711/163 |

Primary Examiner—Tod R. Swann
Assistant Examiner—Pierre Michel Bataille
Attorney, Agent, or Firm—Blakely, Sokoloff, Taylor & Zafman LLP

[57] ABSTRACT

A multiprocessor data processing system includes a private data bus and a private program bus coupled to each of the processors. Coupled between the private data buses is a plurality of memory banks, each of which can be dynamically switched between the processors to move blocks of data without physically transferring the data from one bank to another. Likewise, a plurality of memory banks is coupled between the program buses. These memory banks are loaded with pages of program instructions from external memory over a shared bus. Any one of the pages can be coupled to either of the processors on its respective private program bus. When the pages are coupled to the shared bus, they appear as a contiguous address space. When a page is coupled to one of the private program buses, the addressing mode is changed so that the page is mapped to a common address space. This permits the program code to be loaded into any available page, and the processors can execute the code regardless of where it has been loaded, thereby permitting easy relocatability.

8 Claims, 2 Drawing Sheets

MEMORY ADDRESS TRANSLATIONS FOR PROGRAMS CODE EXECUTION/RELOCATION

This is a Continuation-in-Part of Provisional application Ser. No. 60/034,638 filed Sep. 29, 1995.

BACKGROUND OF THE INVENTION

1. Field of the Invention

This invention relates generally to the field of data processing systems and particularly to a shared memory structure for a multiprocessor system.

2. Prior Art

Communications processing in modems, digital cellular phones and the like typically employs a microprocessor controller and one or more digital signal processing (DSP) co-processors. It is desirable to provide a processing system that integrates all communications processing functions on a single integrated circuit. Due to limitations on the number of pins in a package and the long access times to access data from external memory, it is a practical necessity for one or more processors in a single chip multi-processor to execute from internal memory, as well as use internal memory to maintain data. It is necessary to load program code from external memory into the internal memories and execute from them, and at the same time permit relocation of code within the pages of internal memory to facilitate runtime process switching.

Due to the fundamental nature of DSP computations, the integration of data and program memories with the DSP engines on a single chip can provide significant savings in cost and power dissipation. On the other hand, on-chip random access memory (RAM) is very "expensive" in terms of power requirements and silicon area. One alternative is to use programmed read only memory (ROM) for the DSP engines; however, this makes product maintenance and development more difficult. The present invention provides a unique memory architecture that addresses these conflicting requirements.

SUMMARY OF THE INVENTION

The present invention is directed to a data processing system having at least two independent processors. Each of the processors has a private data bus and a private program bus. Coupled between the private data buses is a plurality of memory banks, each of which can be dynamically switched between the processors to move blocks of data without physically transferring the data from one bank to another. Likewise, a plurality of memory banks is coupled between the program buses. These memory banks are loaded with pages of program instructions from external memory over a shared bus. Any one of the pages can be coupled to either of the processors on its respective private program bus. When the pages are coupled to the shared bus, they appear as a contiguous address space. When a page is coupled to one of the private program buses, the addressing mode is changed so that the page is mapped to a common address space. This permits the program code to be loaded into any available page, and the processors can execute the code regardless of where it has been loaded, thereby permitting easy relocatability.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Due to limitations on the number of pins in a package and the long access times to access data from external memory, it is preferable that multiple processors in a single-chip multiprocessor execute from internal memory. As a result, it is necessary to load program code into these internal memories and execute from it, and at the same time permit relocation of code within the pages of memory present inside the chip to facilitate run time process switching.

The invention utilizes an address translation mechanism where all the pages appear at contiguous address space when program code is loaded into these pages. However, before the program code is executed by an internal processor the addressing mode is changed in such a manner that all pages are mapped to the same address. All the pages of the program are assembled to that address. Thus, depending on the availability of a page, program code can be loaded into any page, and the internal processor can execute it regardless of where it has been loaded, thus permitting easy relocatability.

The ability to connect memory pages to one of multiple buses is an essential element of this invention. In a typical environment with two DSPs, for a bus coupled to one of the DSPs, all memory pages are mapped to contiguous addresses, while on the other bus coupled to the other DSP, they are mapped to the same address space. Since the memory is single ported, selection of which bus the memory is connected to is determined by the control word written to memory configuration registers.

Figure 1:
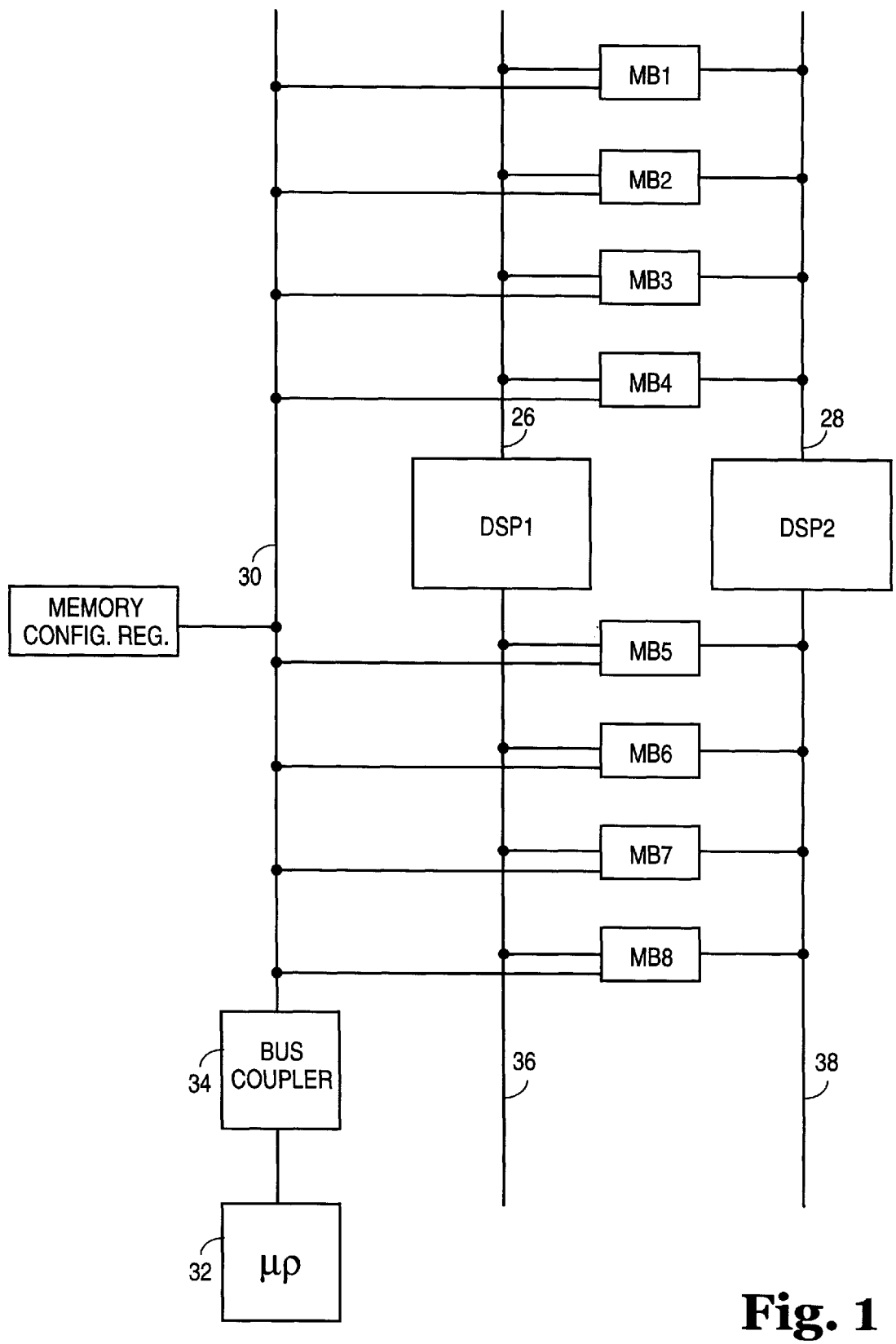
FIG. 1 is a partial block diagram of a multiprocessor system according to the invention.

FIG. 1 illustrates a data processing system incorporating the present invention. A single chip multiprocessor is shown. Such a device may be advantageously employed, for example, as a data communication processor for use in modems, digital cellular phones, and the like. In the illustrated system, there are two digital signal processors (DSP's), designated DSP1 and DSP2. The DSP's are preferably reduced instruction set computing (RISC) processors optimized for performing the repetitive signal processing tasks associated with communications processing. However, the present invention is not limited to communications processing applications. As will be more fully appreciated by the discussion that follows, the present invention has wide applicability in multiprocessor environments.

The system illustrated in FIG. 1 includes an array of random access memories (RAM) or memory banks designated MB1–MB4. Each of these memory banks is coupled to a private program bus 26 for processor DSP1 and to a corresponding private programming bus 28 for processor DSP2. Each of the memory banks is also coupled to a shared bus 30 which communicates with microprocessor 32 through bus coupler 34. Microprocessor 32 is a general purpose processor which supervises operation of the multiprocessor system and, in communications applications, performs protocol and other non-repetitive processing tasks. Additional arrays of RAM MB5–MB8 are coupled to shared bus 30 and to respective private data buses 36 and 38 for DSP1 and DSP2. Although the present invention is described in terms of a multiprocessor system having two DSP's and four banks each of program and data memory, it will be appreciated that the invention is not limited in this regard. The same principles apply regardless of the number or type of processors or the number of shared memory banks.

DSP1 and DSP2 process data in memory banks MB5–MB8 in accordance with program instructions stored in one of memory banks MB1–MB4. Any one of the program memory banks is coupled to a processor at a particular time. Program instructions are stored in off-chip memory devices and are transferred to program memory banks MB1–MB4 over shared bus 30 under the control of a direct memory access (DMA) unit resident in bus coupler 34. Program instructions are transferred to the program memory banks in "pages" as will be more fully explained below. In an exemplary embodiment of this invention, each of program memory banks MB1–MB4 comprises a 512-word memory for a total storage capacity of 2 K words.

Digital signal processing programs typically involve repetitive computations with little conditional branching; for example, data pump operations in a modem system. The present invention is particularly well suited for this processing environment. An appropriate page of program instructions is retrieved from the off-chip storage and loaded into an available one of program memory banks MB1–MB4. The memory bank is then coupled to the private program bus of the processor that will perform the program steps of the retrieved page. The other memory banks remain available for use by the other processor or for access to the shared bus to retrieve additional pages. Upon completion of execution of the program steps within a retrieved page, the memory bank is released from the private program bus and another memory bank, containing the program steps that are to be executed next, is coupled to the private program bus. The processors are thus provided with physical memory pages that are swapped virtually immediately without the latency associated with reloading a single dedicated program memory.

Each of the memory banks MB1–MB4 is single-ported, but is software configurable through memory configuration registers. A control word written into the appropriate memory configuration register selects the bus to which the memory bank in connected. En the exemplary embodiment, the control word simply comprises a 2-bit nibble for each of the memory banks to designate the shared bus {0,0}, DSP1 private bus {0,1} or DSP2 private bus {1,0}.

Figure 2:
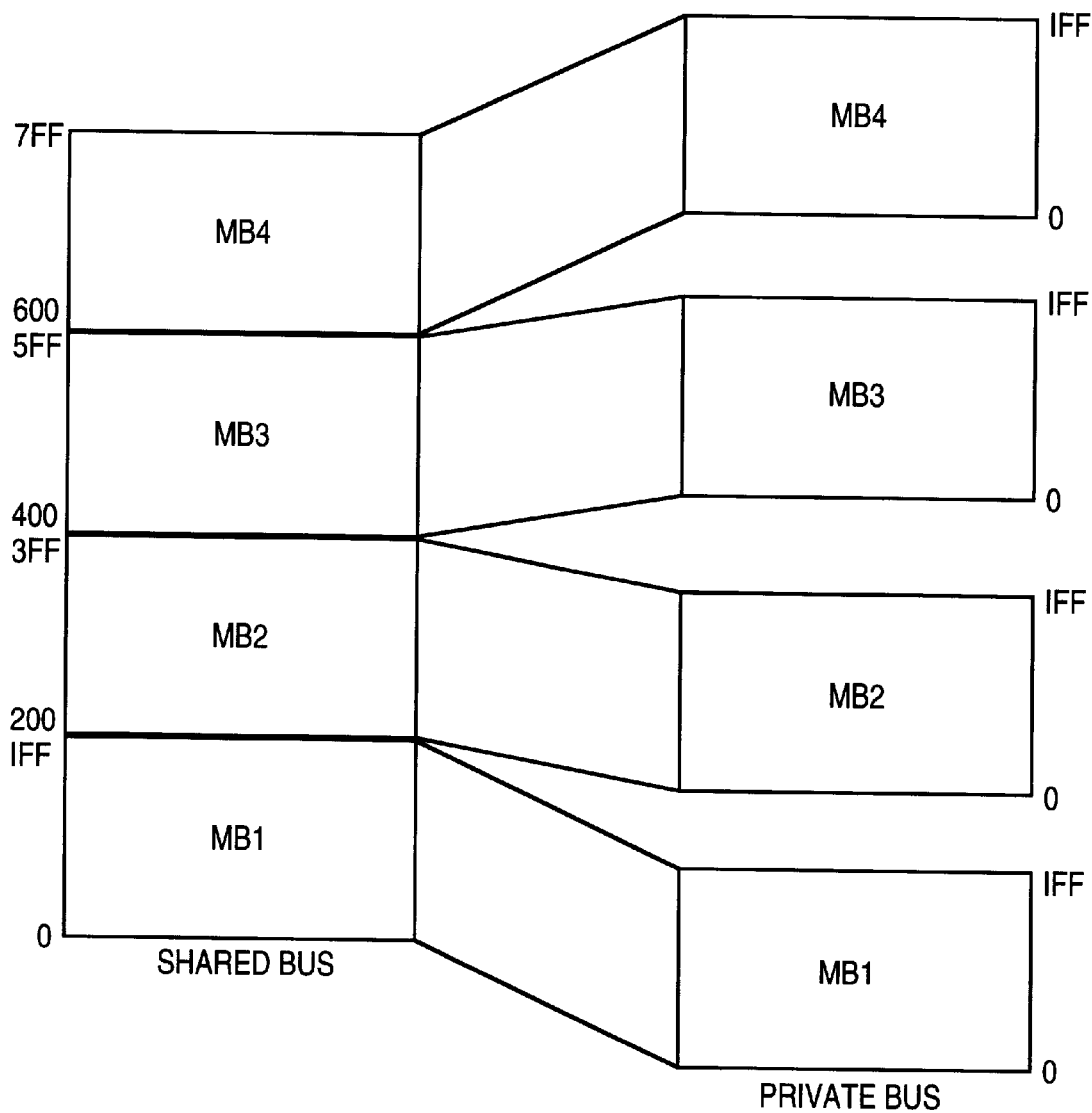
FIG. 2 illustrates translation of the memory bark address space in accordance with the invention.

As already explained, each of the program memory banks MB1–MB4 constitutes a physical page of memory. As illustrated in FIG. 2, these pages collectively appear as a contiguous address space when coupled to the shared bus 30. In the illustrative embodiment described herein, this address space comprises 2 K addresses. When the individual memory banks are coupled to one of the private program buses 26 or 28, the addressing mode is changed so that the page is mapped to a single address space of 512 addresses that is the same for each of the memory bank pages. All program code is referenced to a common zero address point and does not need to be recompiled depending on which page the code is in. Thus, depending upon the availability of a physical page, program code can be loaded into any page and the signal processor can execute the program code regardless of where it has been loaded, thereby permitting easy relocatability.

The memory architecture of the present invention may be implemented in one embodiment as follows.

Four banks of RAM each configured as one 512×16 bit segment, for use as program RAM by DSP1 and DSP2.

(MB1, MB2, MB3, MB4) Total size: 4 K Bytes, RAM

Two Banks of RAM, each configured as two 256×16 bit segments, accessible to DSP1 and DSP2 extended data ports.

(MB5, MB6) Total size: 1 K Bytes, RAM

Two Banks of RAM, each configured as two 256×16 bit segments, accessible to DSP1 and DSP2 extended data ports.

(MB7, MB8) Total size: 1 K Bytes, RAM

These memory banks are configured through two memory configuration registers.

Memory Configuration Register 0:

| Bits | Description |
| --- | --- |
| [15] | Enable bit for MB4 Configuration bits. Write 1 to configure bank |
| [14] | Enable bit for MB3 Configuration bits. Write 1 to configure bank |
| [13] | Enable bit for MB2 Configuration bits. Write 1 to configure bank |
| [12] | Enable bit for MB1 Configuration bits. Write 1 to configure bank |
| [11:10] | Unused |
| [9:8] | Mc_Bnk4[2:0]: Configuration bits for MB4 |
| [7:6] | Mc_Bnk3[2:0]: Configuration bits for MB3 |
| [5:4] | Mc_Bnk2[2:0]: Configuration bits for MB2 |
| [3:2] | Mc_Bnk1[2:0]: Configuration bits for MB1 |
| [1:0] | Unused |

Memory Configuration Register 1:

| Bits | Description |
| --- | --- |
| [15] | Enable bit for MB8 Configuration bits Active low, Write 0 to configure bank |
| [14:12] | Mc_Bnk8[2:0]: Configuration bits for MB8 |
| [11] | Enable bit for MB7 Configuration bits Active low. Write 0 to configure bank |
| [10:8] | Mc_Bnk7[2:0]: Configuration bits for MB7 |
| [7] | Enable bit for MB6 Configuration bits Active low. Write 0 to configure bank |
| [6:4] | Mc_Bnk6[2:0]: Configuration bits for MB6 |
| [3] | Enable bit for MB5 Configuration bits Active low. Write 0 to configure bank |
| [2:0] | Mc_Bnk5[2:0]: Configuration bits for MB5 |

Program RAM Switchable Between DSP1 and DSP2 (MB1, MB2, MB3, MB4)

The valid configuration bits, Mc_Bnk1, Mc_Bnk2 and Mc_Bnk3 and Mc_Bnk4 are:

| Bits | Description |
| --- | --- |
| 00 | to bus 30 |
| 01 | to DSP1 Program Bus 26 |
| 10 | to DSP2 Program Bus 28 |

All other selections are undefined.

This set consists of four segments of 512 K×16-bit RAMs.

The banks can only be connected to the program bus 26 or 28 of the two DSPs or to bus 30.

When connected to bus 30, the DSPs could use it for data handling, even though it could be slower in access than the dedicated blocks, due to the contention.

Data RAM Switchable Between DSP1 and DSP2 (MB5, MB6)

The valid configuration bits, Mc_Bnk5 and Mc_Bnk6 are:

| Bits | Description |
| --- | --- |
| 000 | to bus 30 |
| 001 | to DSP1 Data Expansion Port |
| 010 | to DSP2 Data Expansion Port |

All other selections are undefined.

This set consists of two segments of 256×16 bits of RAM.

The banks can only be switched between the data expansion ports connected to buses 36 and 38 of DSP1 or DSP2, in addition to the connection to bus 30. Therefore, they cannot be used as program memory. They can be dynamically switched between the different buses for transferring blocks of data and messaging.

The enable bit for each field (the MSB of the nibble) should be set to 0 to enable a write into the appropriate bit positions.

Data RAM Switchable Between DSP1 and DSP2 (MB7, MB8)

The valid configuration bits, Mc_Bnk7 and Mc_Bnk8 are:

| Bits | Description |
| --- | --- |
| 000 | to bus 30 |
| 001 | to DSP1 Data Expansion Port |
| 010 | to DSP2 Data Expansion Port |

All other selections are undefined.

This set consists of two segments of 256×16 bits of RAM.

The banks can only be switched between the data expansion ports connected to buses 36 and 38 of DSP1 or DSP2, in addition to the connection to bus 30. Therefore, they cannot be used as program memory. They can be dynamically switched between the different buses for transferring blocks of data and messaging.

The enable bit for each field (the MSB of the nibble) should be set to 0 to enable a write into the appropriate bit positions.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A single chip multiprocessor system comprising:

a) a plurality of digital signal processors (DSPS);

b) a first array of random access memories (RAMs), each of which is coupled to a private program bus corresponding to each of said DSPs, and to a shared bus coupled to a microprocessor through a bus coupler, each of said first array of RAMs having a physical page of memory and is configurable through corresponding memory configuration control bits wherein when the RAMs of the first array are coupled to one of the private program buses, and addressing mode is changed so that each of said pages is mapped to a single address space that is the same for each of the RAM pages;

c) a second array of RAMs each of which is coupled to a private data bus corresponding to each of said DSPs, and to said shared bus, wherein each of said second array of RAMs is configurable through corresponding memory configuration control bits.

2. The system defined by claim 1 wherein a control word written into one of said memory configuration control bits selects one of said program buses, and said shared bus to which a corresponding RAM of said first array is connected.

3. The system defined by claim 1 wherein a control word written into one of said memory configuration control bits selects one of said data buses, and said shared bus to which a corresponding RAM of said second array is connected.

4. The system defined by claim 2 wherein there are two DSPs and the control word comprises a 2-bit nibble for each of the RAMs of the first array to designate one of a shared bus a DSP1 private bus and a DSP2 private bus.

5. The system defined by claim 3 wherein there are two DSPs and the control word comprises a 2-bit nibble for each of the RAMs of the second array to designate one of a shared bus, a DSP1 private bus and a DSP2 private bus.

6. The system defined by claim 1 wherein, each of the RAMs of the first array comprises said physical page of memory, said pages collectively appearing as a contiguous address space when coupled to the shared bus.

7. The system defined by claim 1 wherein all program code is referenced to a common zero address point.

8. The system defined by claim 1 wherein, a program code is loaded into any available physical page and the DSP to which it is coupled executes the program code regardless of where it has been loaded.

* * * * *

UNITED STATES PATENT AND TRADEMARK OFFICE
CERTIFICATE OF CORRECTION

PATENT NO. : 5,909,702
DATED : June 1, 1999
INVENTOR(S) : Jalfon et al.

It is certified that error appears in the above-identified patent and that said Letters Patent is hereby corrected as shown below:

<u>Column 2,</u>
Line 1, delete "bark" and insert -- bank --.

Signed and Sealed this

Sixth Day of April, 2004

JON W. DUDAS
*Acting Director of the United States Patent and Trademark Office*